US006957871B2

(12) United States Patent
Maki

(10) Patent No.: US 6,957,871 B2
(45) Date of Patent: Oct. 25, 2005

(54) VEHICLE BRAKE DEVICE

(75) Inventor: Kazuya Maki, Asahi-machi (JP)

(73) Assignee: Advics Co., Ltd., Aichi (JP)

( * ) Notice: Subject to any disclaimer, the term of this patent is extended or adjusted under 35 U.S.C. 154(b) by 0 days.

(21) Appl. No.: 10/725,291

(22) Filed: Dec. 2, 2003

(65) Prior Publication Data

US 2004/0108770 A1 Jun. 10, 2004

(30) Foreign Application Priority Data

Dec. 2, 2002 (JP) .............................. 2002-349608

(51) Int. Cl.[7] .............................................. B60T 8/44
(52) U.S. Cl. ............................. 303/114.1; 303/113.3; 60/553; 60/545
(58) Field of Search ................... 303/152, 113.3, 303/114.1, 114.2, 115.1, 115.5, 114.3, 113.4, 303/115.4; 60/553, 545; 188/358, 359

(56) References Cited

U.S. PATENT DOCUMENTS

| 4,416,491 A | * | 11/1983 | Belart et al. ............. 303/114.1 |
| 4,867,509 A | * | 9/1989 | Maehara et al. ........ 303/122.01 |
| 5,878,573 A | * | 3/1999 | Kobayashi et al. ........ 60/547.1 |
| 6,641,231 B2 | * | 11/2003 | Kusano et al. ........... 303/114.1 |
| 6,641,233 B2 | * | 11/2003 | Kusano et al. ............... 303/152 |
| 6,705,682 B2 | * | 3/2004 | Kusano et al. ........... 303/114.1 |
| 6,709,072 B2 | * | 3/2004 | Kusano et al. ........... 303/113.4 |
| 6,729,698 B2 | * | 5/2004 | Kusano et al. .............. 303/191 |
| 6,789,857 B2 | * | 9/2004 | Kusano .................... 303/114.1 |
| 2002/0140283 A1 | | 10/2002 | Kusano et al. |

FOREIGN PATENT DOCUMENTS

JP        2002-264795 A        9/2002

* cited by examiner

Primary Examiner—Matthew C. Graham
Assistant Examiner—Mariano Sy
(74) Attorney, Agent, or Firm—Buchanan Ingersoll PC

(57) ABSTRACT

A more reliable hydraulic brake device is proposed which is capable of regenerative cooperative control and eliminates wasteful consumption of electric power. In a hydraulic brake device capable of regenerative cooperative control, a hydraulic pressure adjusting device is provided to adjust the hydraulic pressure in the auxiliary hydraulic chamber to a desired value that is above the output hydraulic pressure value of the pressure adjusting valve. During regenerative cooperative control, the output hydraulic pressure of the pressure adjusting valve is supplied to the auxiliary hydraulic chamber as it is. During non-regenerative cooperative control the output hydraulic pressure of the pressure adjusting valve is increased corresponding to regenerative braking force and supplied to the auxiliary hydraulic chamber.

6 Claims, 4 Drawing Sheets

US 6,957,871 B2

VEHICLE BRAKE DEVICE

BACKGROUND OF THE INVENTION

This invention relates to a vehicle brake device which permits regenerative cooperative control, and particularly to a reliable and inexpensive vehicle brake device.

U.S. patent publication Ser. No. 2002/0140283A1 discloses a vehicle brake device which can perform regenerative cooperative control. One of the brake devices disclosed in this patent publication is shown in FIG. 4.

This brake device 10 includes a brake pedal 11, a hydraulic pressure generating device 12 for producing a predetermined hydraulic pressure by means of a power-driven pump, an electric control device 13 for controlling the brake device, a reservoir 14, a cylinder 15, a pressure adjusting valve 16, hydraulic passages 17, 20, 21, a master cylinder 18, an auxiliary hydraulic chamber 19 that receives the output hydraulic pressure of the pressure-adjusting valve 16, wheel cylinders 22–25 for imparting braking force to the vehicle wheels, electromagnetic proportional valves 26 and 27, pressure sensors 28 and 29, solenoid valves 28 and 29, and check valves 32 and 33.

In this brake device 10, hydraulic pressure P1 supplied from the hydraulic pressure generating device 12 is adjusted by the pressure adjusting valve 16 to a value P2 corresponding to the brake operating force applied to the brake pedal 11 and the hydraulic pressure thus adjusted is introduced into the auxiliary hydraulic chamber 19. The master cylinder 18 is activated by the introduced hydraulic pressure to generate hydraulic pressure P4 corresponding to the hydraulic pressure in the auxiliary hydraulic pressure chamber 19 in hydraulic chambers 18e and 18i of the master cylinder 18. The hydraulic pressure P4, which is output from the master cylinder 18, is supplied to the wheel cylinders 22–25, thereby producing braking force corresponding to the brake operating force.

For regenerative cooperative braking, a command is given from the electrical control device 13 to the electromagnetic proportional valves 26 and 27 to lower the hydraulic pressure in the auxiliary hydraulic chamber 19 from P2 to P3. By arranging such that the hydraulic pressure in the auxiliary hydraulic chamber 19 can be reduced to any value below the output hydraulic pressure of the pressure adjusting valve 16, the braking force produced under hydraulic pressure during regenerative cooperative braking can be reduced by an amount corresponding to the regenerative braking force, so that the regenerative braking force can be fully utilized for vehicle braking.

In the brake device of the JP patent publication 2002-264795, based on information from the pressure sensor 28, the electromagnetic proportional valves 26 and 27 are activated to control the hydraulic pressure in the auxiliary hydraulic chamber 19 to a given value below the output hydraulic pressure value of the pressure adjusting valve 16. Thus, if the pressure sensor 28 or electromagnetic proportional valves 26, 27 should fail during pressure adjustment, it is possible that the hydraulic pressure in the auxiliary hydraulic chamber 19 be reduced to 0 atm., so that the braking force may drop to zero.

An object of this invention is to solve this problem, thereby improving the reliability of a brake device used for regenerative braking.

SUMMARY OF THE INVENTION

According to this invention, there is provided a vehicle brake device comprising a hydraulic pressure generating device for generating a predetermined hydraulic pressure, a pressure adjusting valve for adjusting the hydraulic pressure supplied from the hydraulic pressure generating device to a value corresponding to brake operating force, an auxiliary hydraulic chamber, a master cylinder activated by hydraulic pressure supplied from the pressure adjusting valve into the auxiliary hydraulic chamber to generate hydraulic pressure corresponding to the hydraulic pressure in the auxiliary hydraulic chamber, and wheel cylinders activated by output hydraulic pressure from the master cylinder to impart braking force to vehicle wheels, further comprising a hydraulic pressure adjusting device for increasing and adjusting the hydraulic pressure of the auxiliary hydraulic chamber to a hydraulic pressure value that is not less than the output hydraulic pressure value of the pressure adjusting valve.

Preferably, the hydraulic pressure adjusting device comprises a normally opened differential pressure control valve disposed in a hydraulic passage connecting between the auxiliary hydraulic chamber and the output side of the pressure adjusting valve, and a normally closed pressure increase control valve disposed in a hydraulic passage connecting between the auxiliary hydraulic chamber and the hydraulic pressure generating device.

As the differential pressure control valve and the pressure increase control valve, electromagnetic proportional valves as disclosed in the JP patent publication 2002-264795 may be used.

Preferably, the output of the pressure adjusting valve is set smaller than a target vehicle deceleration. Preferably, the output property of the pressure adjusting valve is set such that the gradient of pressure rise is small in a region where the brake operating force is small, and the gradient of pressure rise is large in a region where the brake operating force is large.

Preferably, the maximum value of the difference between the target vehicle deceleration and the output of the pressure adjusting valve is substantially equal to the maximum value of regenerative braking force obtained by feasible regenerative braking. Also, preferably, the target relation between the brake operating force and the vehicle deceleration is achieved by producing only braking force that is insufficient with the regenerative braking force by means of the differential pressure control valve and the pressure increase control valve.

During regenerative cooperative braking, required deceleration is produced by applying a braking force which is the sum of regenerative braking force and the braking force generated by the hydraulic brake device, to the vehicle. At this time, no command is given to the hydraulic pressure adjusting device to keep the hydraulic pressure adjusting device in an initial (non-operative) state.

On the other hand, during non-regenerative cooperative braking, the hydraulic pressure adjusting device is activated to generate a hydraulic pressure corresponding to the output hydraulic pressure of the pressure adjusting valve (that is, hydraulic pressure which includes a pressure increase corresponding to the regenerative braking force). The fluid pressure is introduced into the auxiliary hydraulic chamber to activate the master cylinder.

Thus, during regenerative cooperative braking, it is possible to store regenerative electric power without activating the hydraulic pressure adjusting device, namely without wastefully consuming electric power.

Also, even if the pressure sensor or hydraulic pressure adjusting device should fail, at least the output hydraulic pressure from the pressure adjusting valve is ensured for deceleration. Thus sensors or the like for fail-safeness are not necessary and it is possible to realize reduction in cost of the brake device.

The hydraulic pressure adjusting device may comprise a differential pressure control valve disposed in a hydraulic passage connecting between the auxiliary hydraulic chamber and the output side of the pressure adjusting valve, and a pressure increase control valve disposed in a hydraulic passage connecting between the auxiliary hydraulic chamber and the hydraulic pressure generating device. This makes it possible to use the hydraulic pressure generating device for supplying hydraulic pressure to the pressure adjusting valve also as a hydraulic pressure source for pressure increase during non-regenerative cooperative braking. This further increases the effect of simplification of the brake device and cost reduction.

Also, by setting the output of the pressure adjusting valve smaller than the target vehicle deceleration, regenerative cooperative control will not be complex. Also, by setting the output properties such that the gradient of pressure rise is small in a region where the brake operating force is small, and the gradient of pressure rise is large where the brake operating force is large, the effect of the brakes during failure improves.

Besides, in the arrangement in which the maximum value of the difference between the target relation between the brake operating force and the vehicle deceleration and the output of the pressure adjusting valve is set such that the braking force by the maximum difference is substantially equal to the maximum value of regenerative braking obtained by feasible regenerative braking. The target relation between the brake operating force and the vehicle deceleration is achieved by producing only braking force that is insufficient with regenerative braking force by means of the differential pressure control valve and the pressure increase control valve. Thus it is not necessary to wastefully producing hydraulic pressure.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
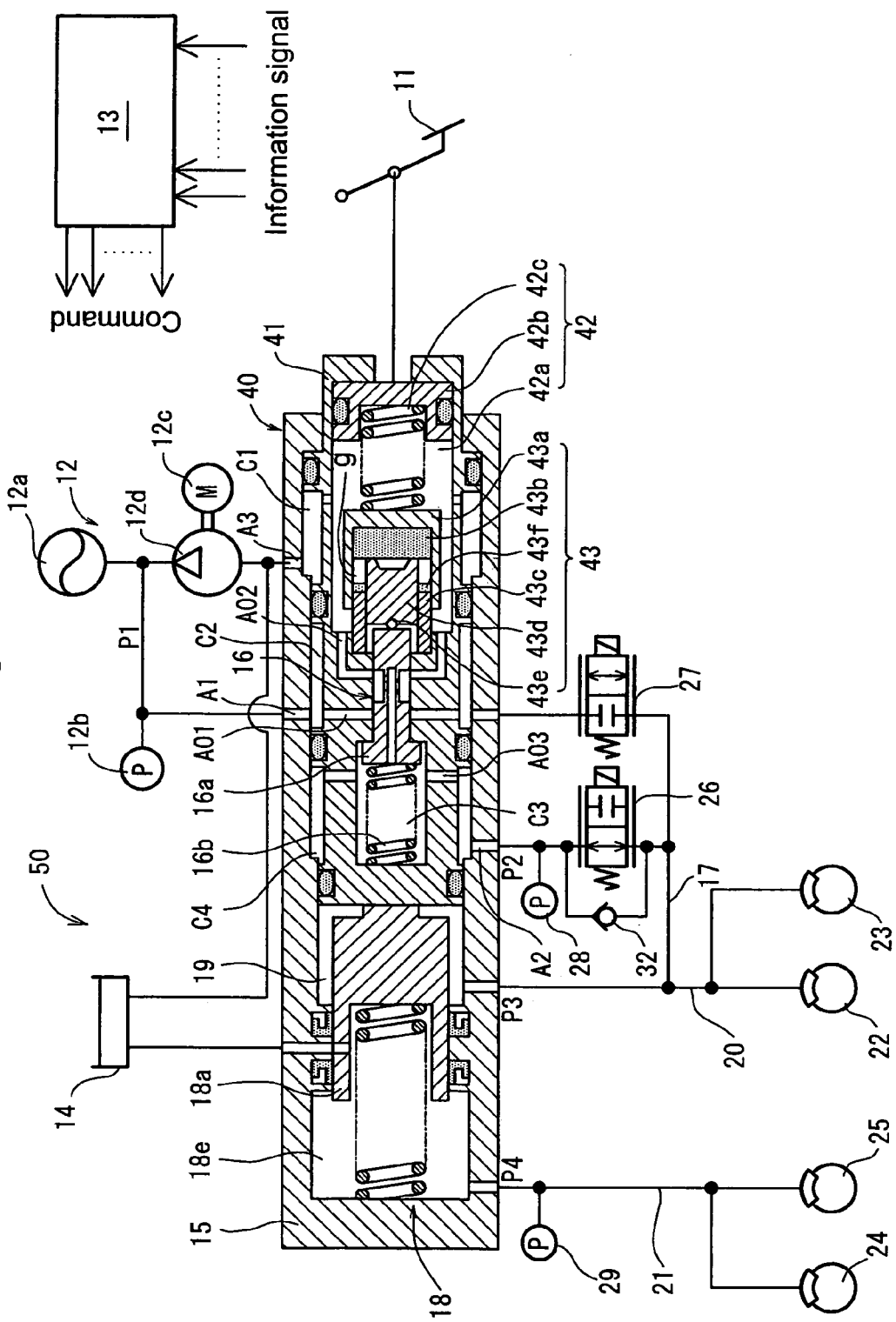
FIG. 1 is a sectional view showing a schematic structure of an embodiment of the brake device according to this invention.

FIG. 1 shows the embodiment of this invention. This vehicle brake device 50 comprises a hydraulic pressure generating device 12 including an accumulator 12a, a pressure sensor 12b and a pump 12d driven by an electric motor 12c, an electrical control device 13 for controlling the brake device, a reservoir 14 storing brake fluid, a pressure adjusting device 40 including a pressure adjusting valve 16, a master cylinder 18, an auxiliary hydraulic chamber 19 for receiving the output hydraulic pressure of the pressure adjusting valve 16, wheel cylinders 22–25 for imparting braking force to vehicle wheels, electromagnetic proportional valves 26, 27, and pressure sensors 28, 29.

The hydraulic pressure generating device 12 generates a predetermined hydraulic pressure P1 by means of a pump 12d, stores it in the accumulator 12a, controls the electric motor 12c based on detection signals of the pressure sensor 12b to keep the hydraulic pressure P1 between predetermined upper and lower limit values, and supplies the hydraulic pressure P1 to the pressure adjusting valve 16.

The pressure adjusting device 40 includes the pressure adjusting valve 16 which adjusts hydraulic pressure supplied from the hydraulic pressure generating device 12 to a value corresponding to the operating force applied to the brake pedal 11 and outputs it. It further includes an auxiliary piston 41 mounted in a cylinder 15 with its tip facing the auxiliary hydraulic chamber 19, a simulator piston 42b provided in the auxiliary piston 41 with its front surface facing a simulator chamber 42a, an elastic member 42c for imparting a stroke corresponding to the brake operating force applied to the brake pedal 11 to the simulator piston 42b, and a distributing device 43 for distributing the brake operating force transmitted from the simulator piston 42b through the elastic member 42c and transmitting to the pressure adjusting valve 16 and auxiliary piston 41.

The simulator chamber 42a, simulator piston 42b and elastic member 42c form a stroke simulator 42.

The distributing device 43 comprises a rubber member 43b arranged in a cup-like member 43a, a tubular member 43c having one end thereof abutting the auxiliary piston 41 and the other end inserted in the cup-like member 43a, and a transmitting member 43d and a steel ball 43e mounted in the tubular member 43c so as to be disposed between the rubber member 43b and the pressure adjusting valve 16. A gap g is formed between the rubber member 43b and an annular resin plate 43f mounted to the end of the tubular member 43c to protect the rubber member 43b.

By providing this distributing device 43, in the initial stage of brake operation, brake operating force is transmitted through the rubber member 43b, the transmitting member 43d and the steel ball 43e to the pressure adjusting valve 16. When the brake operating force exceeds a certain value, the rubber member 43b, which is elastically deformed under compressive force and gets into the gap g, contacts the annular plate 43f. Thereafter, part of the operating force is distributed to the auxiliary piston 41 through the tubular member 43c. Thus, using this function, it is possible to impart such jumping properties that the initial rise of brake hydraulic pressure adjusted by the pressure adjusting valve 16 is steep, to the brake device.

Also, if the inner diameter of the tubular member 43c and the outer diameter of the transmitting member 43d change, the distribution ratio of the brake operating forces transmitted to the pressure adjusting valve 16 and the auxiliary piston 41 changes. Further, as the lengths of these members change, the time when the distribution starts changes. Thus it is possible to change the relation between the brake operating force and the output hydraulic pressure P2 of the pressure adjusting valve by replacing the tubular member 43c and the transmitting member 43d with ones of different sizes.

While the distributing device 43 is a preferable element, it may be omitted and the brake operating force applied to the brake pedal 11 may be directly transmitted to the pressure adjusting valve 16.

As the pressure adjusting valve 16, one is shown in which pressure adjustment is carried out with a spool 16a. The auxiliary piston 41 is provided with a pressure increase port A01, output port A02, and pressure reducing port A03. Changeover of connection between these ports and the adjustment of the degree of opening of these ports are carried out by displacing the spool 16a.

The pressure increase port A01 is normally in communication with the hydraulic pressure generating device 12 through an annular fluid chamber C2 provided around the auxiliary piston 41, and an input port A1 formed in the cylinder 15. The pressure reducing port A03 is normally in communication with the reservoir 14, which is at the atmospheric pressure, through the simulator chambers 42a holes formed in the auxiliary piston 41, an-annular fluid chamber C1 provided around the auxiliary piston 41, and a drain port A3 formed in the cylinder 15. The output port A02 communicates with an output port A2 formed in the cylinder 15 through an annular fluid chamber C4 provided around the auxiliary piston 41.

When the spool 16a is pushed back by a return spring 16b and at an illustrated position (original position), the pressure adjusting valve 16 is in a pressure reduced state with the output port A2 communicating with the pressure reducing port A03 through a passage in the spool 16a. When the brake pedal 11 is stepped in and the spool 16a is pushed in leftwardly in FIG. 1 from the illustrated position, the passage in the spool 16a is shut off both from the pressure reducing port A03 and the pressure increase port A01. Now the pressure adjusting valve 16 is in an output hold state. When the spool 16a is pushed in further leftwardly, the passage in the spool 16a communicates with the pressure increase port A01, so that the wheel cylinders 22–25 are now in a pressure increase state.

The spool 16a of the pressure adjusting valve 16 moves to a balance point where the force which is the sum of the thrust by the hydraulic pressure introduced into the fluid chamber C3 and the load of the return spring 16b balances with the brake operating force applied through the distributing device 43. Thus, the degree of opening of a valve portion formed between the pressure increase port A01 and the shoulder of the spool 16a when the output port A2 communicates with the input port A1 and a valve portion formed between the pressure reducing port A03 and the shoulder of the spool 16a when the output port A2 communicates with the drain port A3 are adjusted, so that the hydraulic pressure P2, which is outputted through the output port A2, will be at a level corresponding to the brake operating force.

The input port A1 and the output port A2 are connected to the auxiliary hydraulic chamber 19 through a hydraulic passage 17 having a meeting point. In the hydraulic passage 17 extending from the output port A2 to the meeting point, there are provided the pressure sensor 28, the normally open electromagnetic proportional valve 26, which functions as a differential pressure control valve, and a check valve 32, which is arranged parallel to the electromagnetic proportional valve 26 (in which the direction of checking is completely opposite to that of the check valve of the device of patent publication 2002-264795). Further, in the hydraulic passage 17 from the input port A1 to the meeting point, there is provided a normally closed electromagnetic proportional valve 27, which functions as a pressure increase control valve.

The master cylinder 18 includes the master cylinder piston 18a which is activated under the hydraulic pressure introduced into the auxiliary hydraulic chamber 19 on its back to generate a hydraulic pressure P4 corresponding to the hydraulic pressure P3 in the auxiliary hydraulic chamber 19 (P4 is substantially equal to P3).

Figure 2:
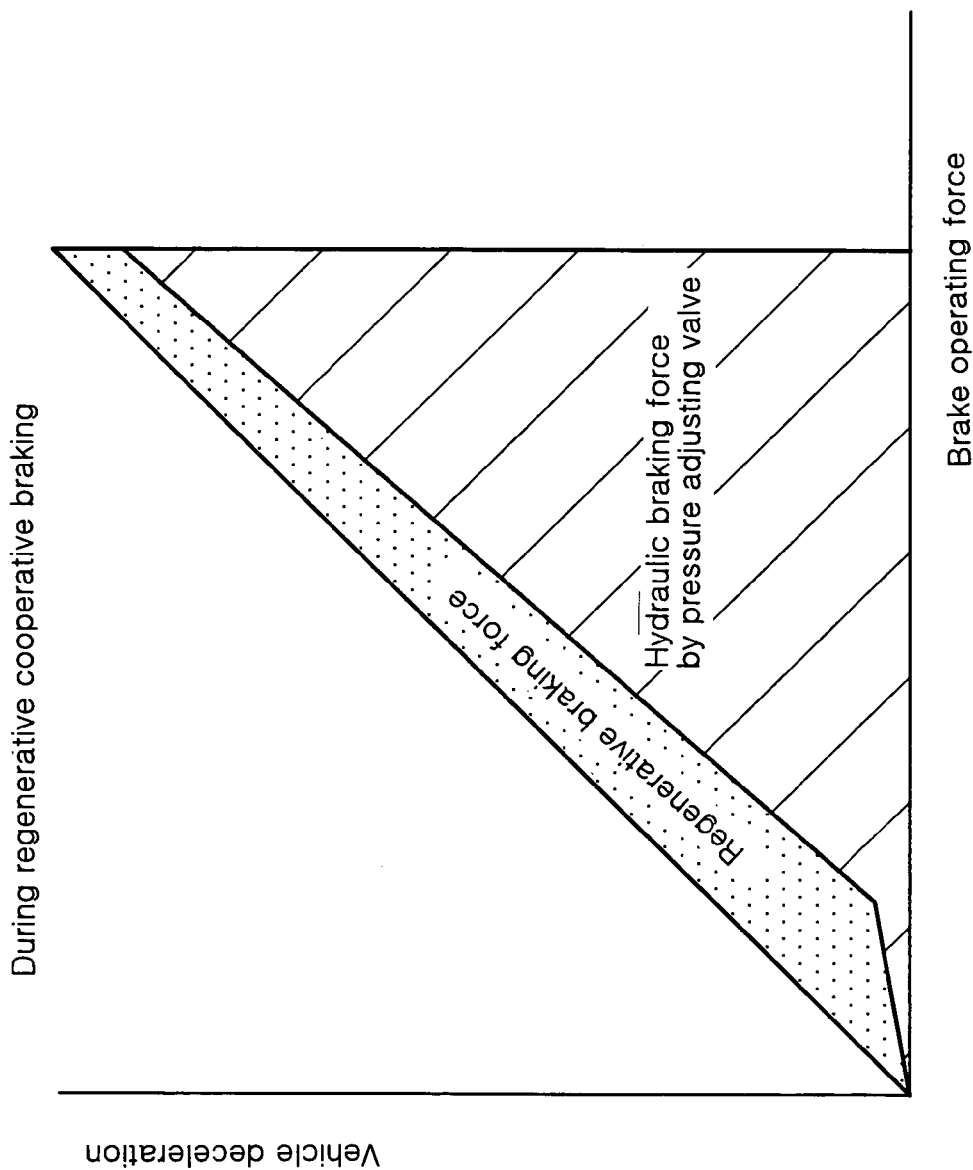
FIG. 2 is a graph showing the relation between the brake operating force and the vehicle deceleration during regenerative cooperative control.
Figure 3:
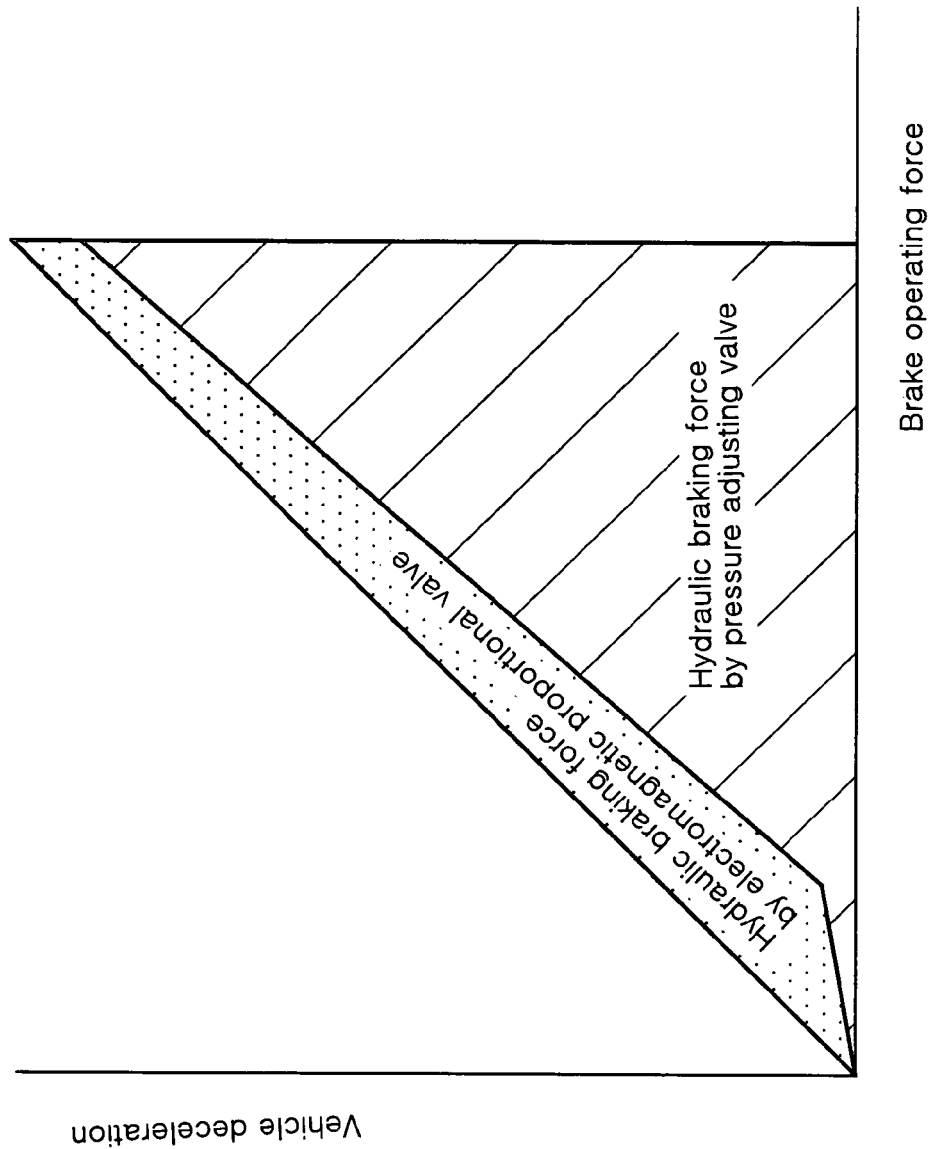
FIG. 3 is a graph showing the relation between the brake operating force and the vehicle deceleration during non-regenerative cooperative control.

In the brake device 50, the output property of the pressure adjusting valve 16 is set to be smaller than the target relation between the brake operating force and the vehicle deceleration. Specifically, as shown in FIGS. 2 and 3, it is so set that in a region where the brake operating force is small, the gradient of pressure rise is small, and in a region where the brake operating force is large, the gradient of pressure rise is large. The gradient of the first-stage pressure rise is preferably as small as possible in view of the regenerative efficiency. The gradient of the second stage pressure rise is preferably as close to the required vehicle deceleration as possible in view of braking performance during failure.

It is preferable that the maximum value of the difference between the target relation between the brake operating force and the vehicle deceleration and the output property of the pressure adjusting valve 16 is set to be substantially equal to the maximum value of the regenerative braking force obtained by feasible regenerative braking (about 2 Mpa in terms of hydraulic pressure). It is also preferable that only the braking force that is short with regenerative braking force is generated by means of the electromagnetic proportional valves 26, 27 to achieve the target relation between the brake operating force and the vehicle deceleration.

With the thus structured brake device 50, during regenerative cooperative braking, as shown in FIG. 2, the braking force generated by the hydraulic pressure of the brake device 50 plus the regenerative braking force is applied to the vehicle to generate a required deceleration. At this time, no command is given to the electromagnetic proportional valves 26, 27 (hydraulic pressure adjusting device) to keep the electromagnetic proportional valves 26, 27 at their initial state.

On the other hand, during non-regenerative cooperative braking, the electromagnetic proportional valves 26, 27 are activated to generate hydraulic pressure P3 corresponding to the output hydraulic pressure P2 of the pressure adjusting valve 16 (which is the hydraulic pressure in which pressure increase corresponding to the regenerative braking force is added as shown in FIG. 3). It is introduced into the auxiliary hydraulic chamber 19 to activate the master cylinder 18, thereby producing a required deceleration with the hydraulic pressure only.

Thus, during regenerative cooperative braking, it is possible to store regenerative electric power without activating the electromagnetic proportional valves 26, 27, i.e. without a waste of electric power.

Also, even if the pressure sensor 28 or the electromagnetic proportional valves 26, 27 fail, since at least the output hydraulic pressure P2 from the pressure adjusting valve 16 is ensured for vehicle deceleration, a sensor or the like is not needed for failsafeness, so that it is possible to reduce the cost of the brake device.

In the illustrated brake device 50, to the wheel cylinders 22 and 23, which are in one line, hydraulic pressure is supplied from the auxiliary hydraulic chamber 19 through a hydraulic passage 20, and to the wheel cylinders 24 and 25, which are in the other line, hydraulic pressure produced in the master cylinder 18 is supplied through a hydraulic passage 21. Even if hydraulic pressure is not produced in the auxiliary hydraulic chamber 19 due to failure in the hydraulic pressure generating device 12 or devices in lines connecting thereto, the auxiliary piston 41, which is prevented from moving in a normal state under the hydraulic pressure in the auxiliary hydraulic chamber 19, is moved by the brake pedal 11. Thus the brake operating force is directly transmitted to the master cylinder 18, so that at least hydraulic pressure which can be manually produced is ensured. This is preferable from a fail-safe viewpoint.

Figure 4:
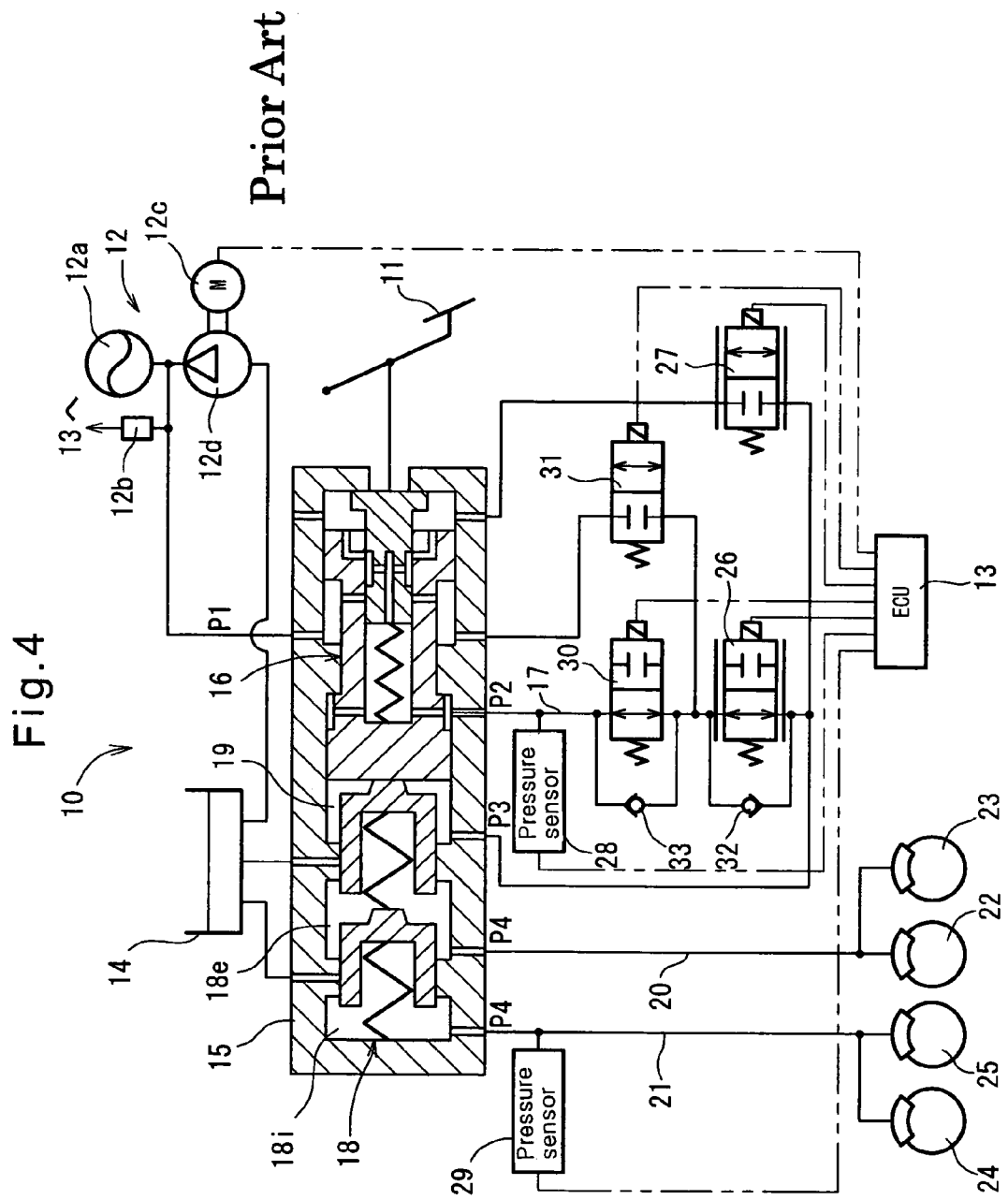
FIG. 4 is a sectional view showing a schematic structure of a conventional brake device which permits regenerative cooperative control.

Like the device of FIG. 4, a tandem master cylinder may be employed to supply the output hydraulic pressure of the master cylinder to the wheel cylinders in two lines. This structure is also high in safety.

As described above, the brake device of this invention is provided with the hydraulic pressure adjusting device which increases the hydraulic pressure in the auxiliary hydraulic chamber to any hydraulic pressure value above the output hydraulic pressure value of the pressure adjusting valve, and is adapted to achieve the target relation between the brake operating force and the vehicle deceleration with the braking force obtained by the output hydraulic pressure of the pressure adjusting valve and the regenerative braking force during regenerative cooperative braking.

On the other hand, during non-regenerative cooperative braking, it is adapted to realize the target relation between the brake operating force and the vehicle deceleration with only the braking force by hydraulic pressure by increasing the hydraulic pressure introduced into the auxiliary hydraulic chamber by the hydraulic pressure adjusting device by an amount corresponding to regenerative braking force. Thus, there will be no useless power consumption. Also, regenerative cooperative control is possible in which regenerative braking force can be used for braking without a waste. Also, even if the pressure sensors or hydraulic pressure adjusting device should fail, vehicle deceleration that differs little from deceleration at a normal time is obtained. Thus, a reliable and inexpensive vehicle brake device can be realised.

In the arrangement in which the hydraulic pressure adjusting device is formed of the differential pressure control valve and pressure increase control valve using the electromagnetic proportional valves, there is no need to separately provide a hydraulic pressure source for pressure increase. Thus it is possible to further simplify the brake device and reduce its cost.

What is claimed is:

1. A vehicle brake device comprising a hydraulic pressure generating device for generating a predetermined hydraulic pressure, a pressure adjusting valve for adjusting the hydraulic pressure supplied from said hydraulic pressure generating device to a value corresponding to brake operating force, an auxiliary hydraulic chamber, a master cylinder activated by hydraulic pressure supplied from said pressure adjusting valve into said auxiliary hydraulic chamber to generate hydraulic pressure corresponding to the hydraulic pressure in said auxiliary hydraulic chamber, and wheel cylinders activated by output hydraulic pressure from said master cylinder to impart braking force to vehicle wheels, further comprising a hydraulic pressure adjusting device for increasing and adjusting the hydraulic pressure of said auxiliary hydraulic chamber to a hydraulic pressure value that is not less than an output hydraulic pressure value of said pressure adjusting valve.

2. The vehicle brake device as claimed in claim 1 wherein said hydraulic pressure adjusting device comprises a normally opened differential pressure control valve disposed in a hydraulic passage connecting between said auxiliary hydraulic chamber and the output side of said pressure adjusting valve, and a normally closed pressure increase control valve disposed in a hydraulic passage connecting between said auxiliary hydraulic chamber and said hydraulic pressure generating device.

3. The vehicle brake device as claimed in claim 1 wherein an output property of said pressure adjusting valve is set such that a vehicle deceleration obtained by the output of said pressure adjusting valve is smaller than a target vehicle deceleration.

4. The vehicle brake device as claimed in claim 1 wherein an output property of said pressure adjusting valve is set such that the gradient of pressure rise is small in a region where the brake operating force is small, and the gradient of pressure rise is large in a region where the brake operating force is large.

5. The vehicle brake device as claimed in claim 4 wherein a maximum value of the difference between a target vehicle deceleration and the output property of said pressure adjusting valve is set so as to be substantially equal to a maximum value of regenerative braking force obtained by feasible regenerative braking.

6. The vehicle brake device as claimed in claim 4 wherein a target relation between the brake operating force and vehicle deceleration is achieved by producing only a braking force that is insufficient with a regenerative braking force by a differential pressure control valve and a pressure increase control valve.

* * * * *